Feb. 1, 1944.    R. F. HLAVATY    2,340,750
SELF-ALIGNING PULLEY
Filed Nov. 7, 1941    5 Sheets-Sheet 3

Feb. 1, 1944.   R. F. HLAVATY   2,340,750
SELF-ALIGNING PULLEY
Filed Nov. 7, 1941   5 Sheets-Sheet 4

Inventor
Rudolph F. Hlavaty
by Parker & Carter
Attorneys.

Patented Feb. 1, 1944

2,340,750

UNITED STATES PATENT OFFICE 2,340,750

SELF-ALIGNING PULLEY

Rudolph F. Hlavaty, Cicero, Ill.

Application November 7, 1941, Serial No. 418,208

29 Claims. (Cl. 74—241)

This invention relates to a self-aligning means, and while it is shown herewith as applied to a self-aligning pulley, it is not limited to that use, and may be applied to any rotary member which it is desirable to supply with self-aligning means. In a broad sense, therefore, it comprises a self-aligning, generally cylindrical member. It may be applied to a pulley which is associated with a belt of any type, and it has, therefore, for one object, to provide self-aligning means for a rotary member.

Another object is to provide automatic self-aligning means for a roller, which may be associated with a belt, a line, a chain, an apron, a screen, or any other member which runs in contact with the rotary member.

Another object is to provide a self-aligning pulley associated with a conveying belt or apron, and it may be embodied in a pulley which is driven or is a driver or is merely an idler.

Another object is to provide in connection with a rotary member surface parts which are self-aligning in response to the movement of some other part associated with the rotary member, when the former part gets into misalignment with the main rotary member.

Other objects will appear from time to time throughout the specification and claims.

This invention is illustrated more or less diagrammatically in the accompanying drawings, wherein.

Like parts are indicated by like characters throughout the specification and the drawings.

As shown in the first eight figures, the device includes a main rotor or shaft which includes a central portion 1, which in the particular form shown is of substantially square cross section. At each end there is a reduced portion 2, and a further reduced portion 3. The reduced portion 3 is carried in suitable bearings 4. At one end, one of the reduced portion 4 may carry a gear 5, by means of which the device is driven, although as above pointed out, the invention may be applied to an idler as well as to a driving or driven member.

The central portion 1 is provided with one or more perforations 6, which extend through it, and as shown, two of these perforations extend diametrically through the member, and two other perforations extend diametrically through the member, but in a plane at right angles to that of the first two perforations. The outer squared faces of the portion 1 are provided with a plurality of ball races 8, 8. Any desirable number of ball races may be provided.

Figures 4, 5, 6:
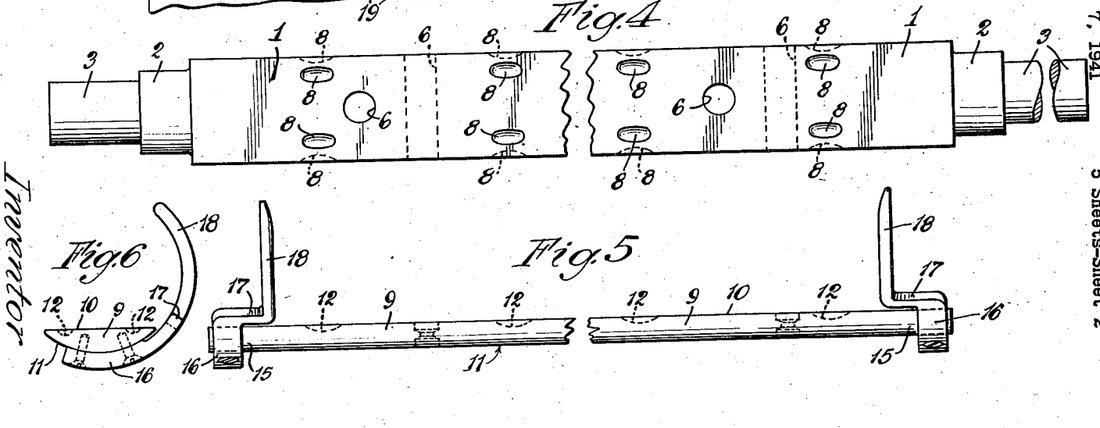
Figure 4 is a plan view of the main rotary member.
Figure 5 is a side elevation of one of the surface members.
Figure 6 is an end view of the members shown in Figure 5.
Figure 7:
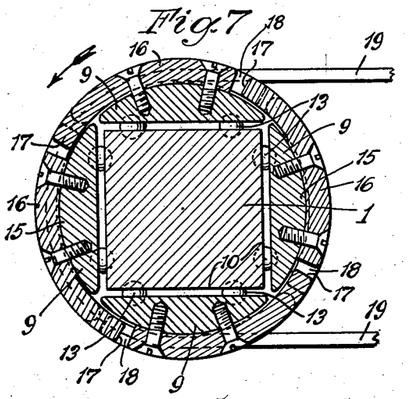
Figure 7 is a transverse section taken at line 7—7 of Figure 2.
Figure 8:
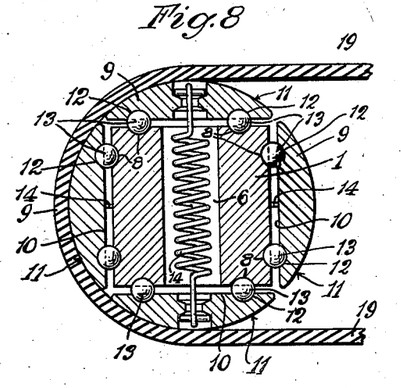
Figure 8 is a transverse section taken at line 8—8 of Figure 2.

Upon each face of the member 1 is mounted a surface member 9. As shown particularly in Figures 7 and 8, these surface members are flat on one side, as at 10, and rounded on the other side, as at 11, and each of them is provided with a number of ball races 12, and the ball races on the inner face of each surface member correspond in number and location to the ball races on the corresponding face of the member 1, and balls 13 are positioned to lie partly in a ball race 8 and partly in a ball race 12. Oppositely placed surface members are yieldingly held together by springs 14, which pass through the perforations 6, and which are engaged at their opposite ends to two of the surface members 9. Each surface member 9 is provided with an extending portion 15, which extends beyond that portion of it upon which the belt will normally be positioned. This portion, as shown, is the same size and shape as the main portion of the member, and upon it is secured a member 16, which carries a laterally directed arm 17 at the outer end of which is a belt contacting portion 18. As shown in Figures 6 and 7 in particular, the total member formed of the parts 16, 17, and 18 is curved to conform to the general curvature of the assembly.

Figure 1:
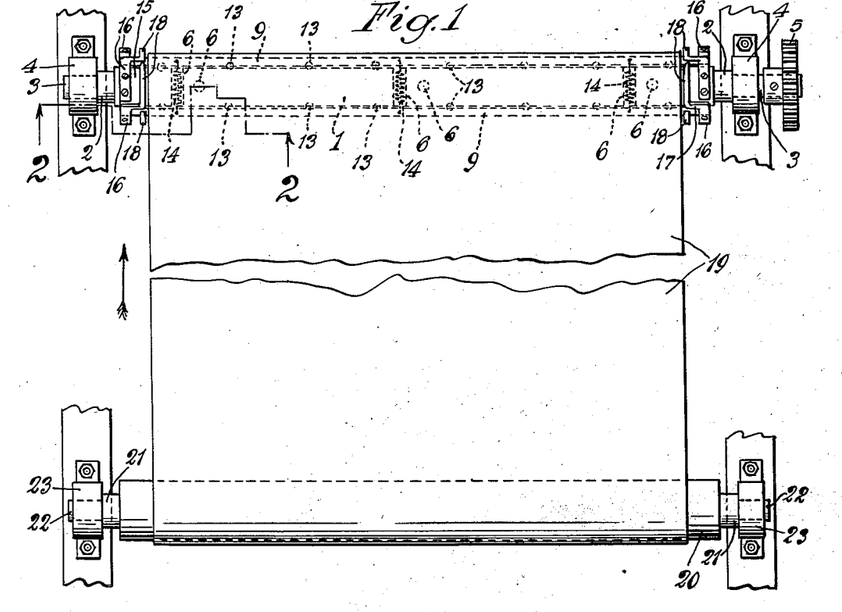
Figure 1 is a plan view of one form of the invention.
Figure 2:
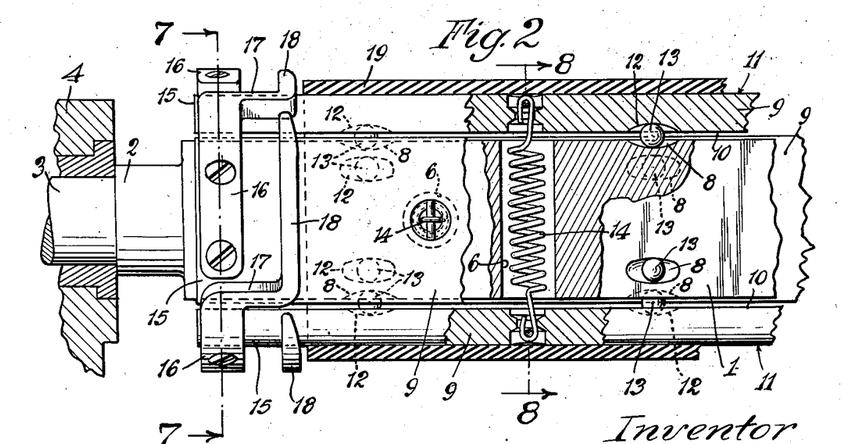
Figure 2 is a longitudinal section taken at line 2—2 of Figure 1, on an enlarged scale.

Member 19 is an apron or belt positioned about the pulley, and as shown it contacts the surface members 9. The belt or apron 19, as shown in Figure 1, is supported at its opposite end by a pulley or rotor 20, which is reduced as 21 and provided with a final reduced portion 22 at each end, and these reduced portions are received in bearings 23. Obviously both pulleys might be of a self-aligning type, and a number of self-aligning pulleys might be associated together in a given installation. For purposes of simplicity, however, only one is shown herewith.

Figure 9:
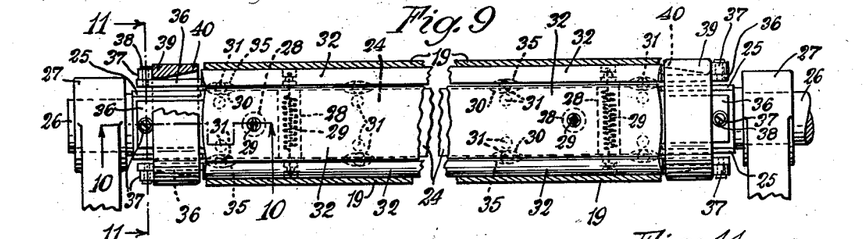
Figure 9 is a view generally similar to Figure 2, showing on a reduced scale a modified form.
Figure 10:
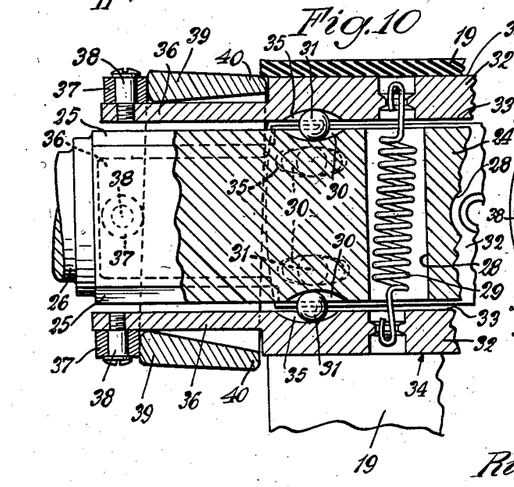
Figure 10 is a longitudinal sectional view taken on an enlarged scale at line 10—10 of Figure 9.
Figure 11:
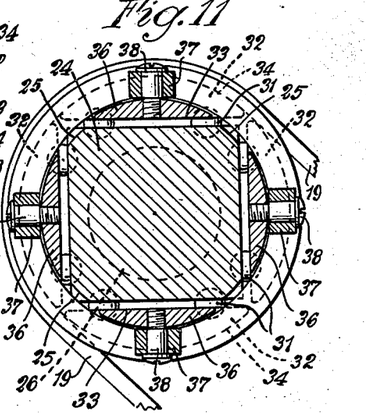
Figure 11 is a transverse section taken at line 11—11 of Figure 9.

In the form shown in Figures 9, 10, and 11, the parts are somewhat similar to those shown in the earlier figures. There is a central body 24 which is of generally rectangular cross section and which may have rounded corners, as at 25, along a portion of its length, although these may be omitted, and it is provided with reduced portions 26 which are received in bearings 27. The body portion 24 is provided with pairs of perforations 28, two of which extend across from each pair of opposite faces and contain springs 29, which are engaged to opposite surface members. The faces of the member 24 are provided with a plurality of ball races 30 in which are positioned balls 31.

Each of the faces of the member 24 has positioned along it a surface member 32. These members are flat on their inner faces, as at 33, and are rounded exteriorly, as at 34, to form a substantially round and substantially continuous belt contacting face. The surface members 32 are provided on their inner or flat faces with ball races 35, which are positioned opposite to corresponding ball races 30 on the member 24, and into which the balls 31 extend. Each of the surface members 32 is provided at its ends with a portion 36 of reduced thickness, and upon each of these portions is mounted a roller 37, which is held in place upon a stud 38. Collars 39 are positioned one at each end of the surface members, so that the collars lie about the reduced portions at the ends of the surface members. As shown particularly in Figure 10, the collars 39 are of reduced thickness toward one end, as at 40.

A further modified form is shown in Figures 12 to 15, inclusive. As there shown, the device comprises a main body section 41, which is squared to provide for flat faces, and each face is provided with a plurality of ball races 42, in which balls 43 are positioned. At each end the member 41 is reduced to form the portions 44, which are received in bearings 45.

Figures 12, 13, 14:
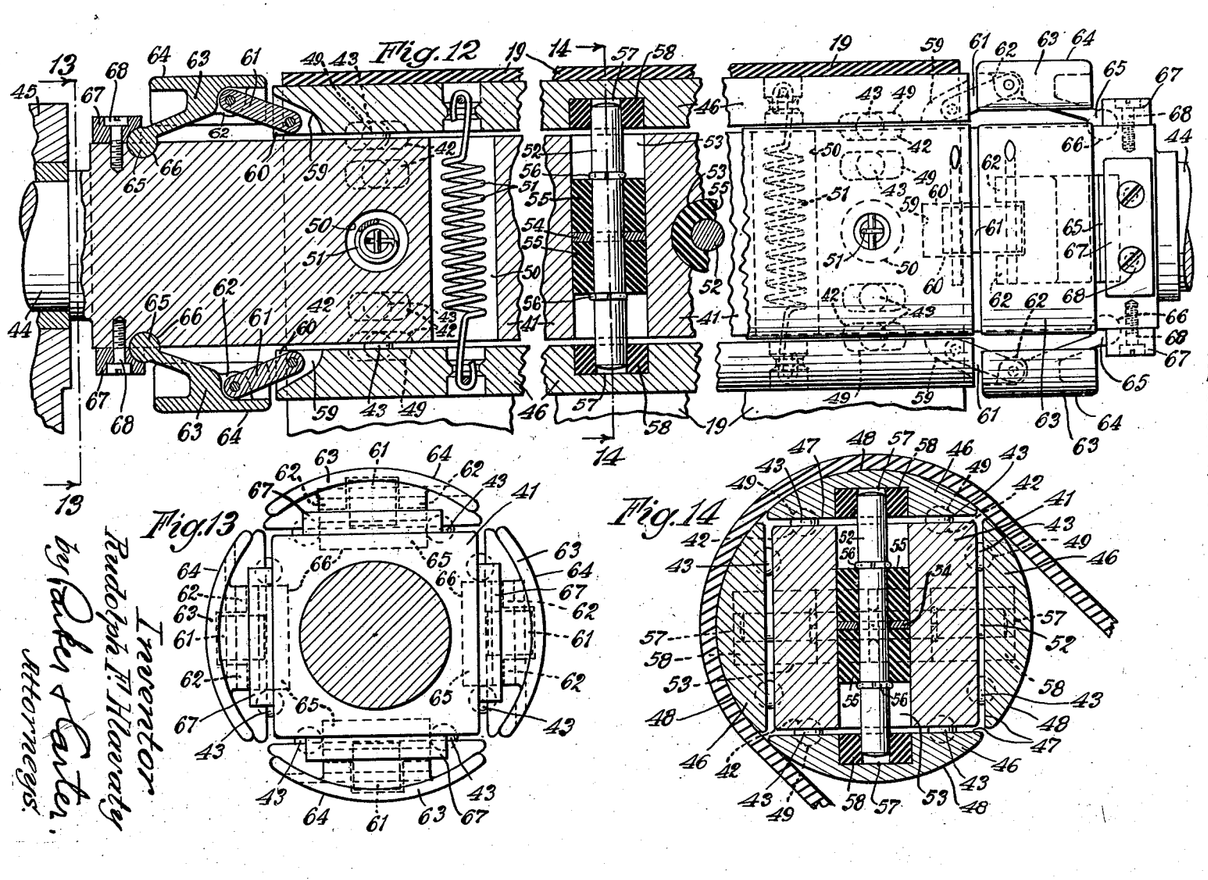
Figure 12 is a view generally similar to Figure 2, illustrating a further modification.
Figure 13 is a transverse section taken at line 13—13 of Figure 12.
Figure 14 is a transverse section taken at line 14—14 of Figure 12.

Upon each face of the member 41 is positioned a surface member 46, which has a generally flat inner face 47 and an arcuate outer face 48. The inner face 47 is provided with a plurality of ball races 49, whose number and position correspond to those of the ball races 42.

As a means for fastening the surface members in place, the body 41 is provided with perforations 50, through which springs 51 extend. These springs are fastened at each end to one of the surface members. Preferably there are two perforations for each pair of surface members and two springs joining each pair of such members. As a means for transmitting movement from one surface member to the other member of the pair, a pin or rod 52 is provided for each pair of surface members, and these pins are positioned within additional perforations 53 formed in the body of the member 41. A washer 54 is positioned adjacent the middle of each pin and is secured in place in the perforation 53. It serves as a bearing. Positioned on each side of the washer 53 may be members 55, formed of rubber or similar material. They are to some degree confined and held in place by rings 56. At each end each pin 52 extends into one of the surface members 46, and each surface member is provided with a pocket or depression 57, which may be lined with a member 58 of rubber or analogous material, and thus the pins are cushioned at their centers and at their ends.

At its end each surface member 46 is cut away as at 59 to provide a projection 60, and upon each projection 60 there is journaled a pair of links 61. These links at their opposite ends are journaled on a tongue or projection 62 which is formed on a member 63. The upper face of each member 63 comprises an arcuate portion 64. Extending from each member 63 is a bearing portion 65 which is mounted in a groove or notch 66 and formed in an adjacent part of the member 41, and it is held in place by a keeper 67, which is itself secured by means of a screw 68.

Figures 15, 16:
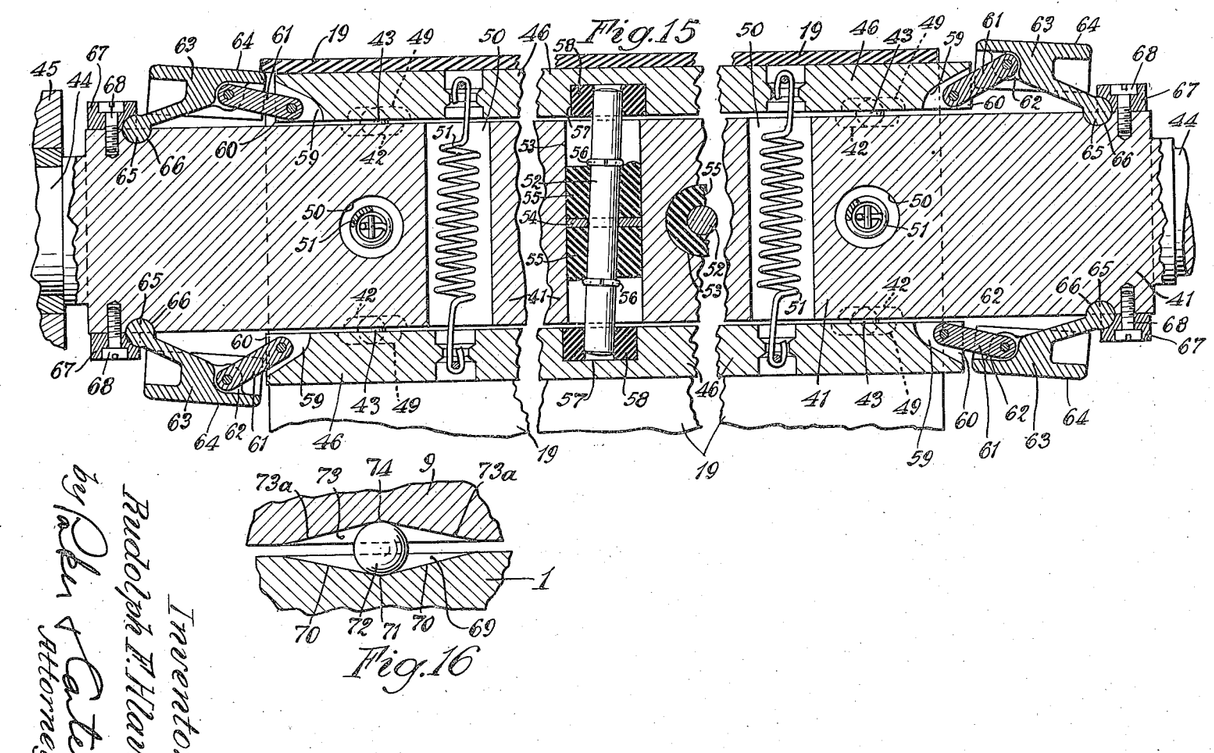
Figure 15 is a view showing the parts of Figure 12 in the position which they assume when the belt commences to move out of alignment.
Figure 16 is a section on an enlarged scale showing a modified form of ball race.

There is shown in Figure 16 a modified form of ball race arrangement which is applicable primarily to the forms of the first 11 figures. As shown in those figures, the various ball races are of rounded or tapered shape, so that a curved incline is provided. In the form of Figure 16, which may for example be applied to Figure 4, the body member 1 of the rotor is provided with a ball race 69 which has two straight portions 70, meeting at the center at 71, and a ball 72 is positioned in this ball race. The surface member 9 is provided with a corresponding ball race 73, which has two straight portions 73a meeting at the center, as at 74. The forms of the device in which the ball race is tapered may embody almost any shape of ball race, and the purpose of the invention will be carried out if the ball race is provided with a deeper portion and with a shallower portion.

It will be realized that whereas I have described and shown a practical and operative embodiment of my invention and the method for carrying it out, nevertheless many changes may be made in the size, shape, number and disposition of parts and in the details and steps of such method without departing from the spirit of my invention. I therefore wish my description and drawings to be taken as in a broad sense illustrative or diagrammatic, rather than as limiting me to my precise showing.

Figure 3:
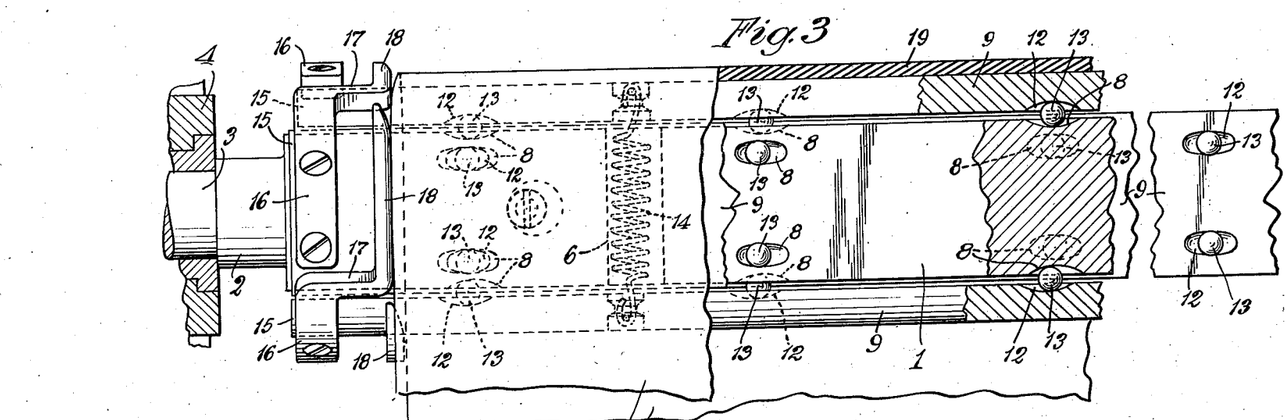
Figure 3 is a longitudinal section shown on the same scale as Figure 2, but in a plane at right angles to that of Figures 2, with parts shown in plan and parts broken away.

The use and operation of the invention are as follows:

In the form shown in Figures 1–8, inclusive, a misaligned belt will contact one of the members 18. Such a condition is shown in Figure 3. Contact with the member 18 tends to move it in the direction into which the misaligned belt has moved or is moving. It will be noticed that each member 18 overlaps or projects forward over the surface member 9, which carries it, and therefore when the misalignment occurs over a given surface member 9, it is the next or following surface member which is moved out of place by the contact of the misaligned belt with the member 18, and thereafter as the pulley rotates the misaligned belt is next received upon the following member 9, which has been moved in the direction of misalignment. As the previously moved surface member comes under the full pressure of the belt, it moves back to the central or neutral position. This occurs because the full pressure of the belt upon the surface member tends to carry that member back to the neutral position or to hold that member in the neutral position. The shape of the ball races 3 and 12 is such that when pressure is exerted on any surface member 9 by the belt, the ball races and the balls under the influence of this pressure cause or tend to cause the surface member 9, which is at that time subject to the belt pressure, to move the central or neutral position, and thus if a surface member has been moved out of the neutral position. By reason of the contact of a misaligned belt with one of its members 18, it will come under the full pressure of the belt in this misaligned position, but will then move back to the properly aligned or neutral position and will thus carry the belt back in the direction opposite that into which it had moved upon being misaligned.

A modified form is shown in Figures 9, 10, and 11, and as there shown a wedge ring 39, 40 takes the place of the members 18. As shown in Figure 9, the belt is properly aligned, and as shown in Figure 10 it has moved out of alignment sufficiently to contact and depress the edge 40 of the wedge ring 39, and this movement has caused the opposite side of the ring to move to the left, carrying with it the opposite surface member 32. When now this surface member, as the pulley rotates, is brought under the full compression of the belt—i. e., when it moves from what is the bottom position of Figure 10 to the top position of Figure 10—it will be under such pressure that the shape of the ball races 30 and 35 in cooperation with the balls 31 will cause it to move back to the central or neutral position, and as it moves backward to the neutral position, it of course carries with it the belt upon it and thus corrects the misalignment. In Figure 10, although the surface members have been described as being the top or bottom, or as being in the top and bottom positions, it is important to recognize that what is really meant is the position of the greatest pressure. In other words, at a given moment one surface member may be subject to the greatest pressure from the belt, and the opposite surface member subject to no pressure, and the two surface members between them, which are of course opposite to each other, will be subject to little or no pressure. Therefore, a misaligned belt will hold the surface member against which it is most heavily bearing in the neutral position, but at the same time it may contact a member 18 or contact or climb up upon a wedge ring 39, 40, and when this occurs it can cause movement of the opposite surface member, since that member is under no pressure from the belt. This effect, of course, is possible and takes place in all the forms of the device.

In the form of Figures 12–15 inclusive, there is a modified construction in which instead of a single wedge ring, a plurality of blocks 63, which may be called wedge blocks, may be used. They are arcuate in shape, as shown in Figure 13. The parts are shown properly aligned in Figure 12 and misaligned in Figure 15. As there shown the belt has moved to the left and has ridden up on one of the blocks 63, forcing it downward. This, because of the link 61, to some degree has moved the upper surface member, which is under the full belt compression, to the right. A reverse movement has been transmitted to the lower surface member 46, which is not under belt compression. Then member 52 is rigid and has a bearing in the ring 54 and when its upper end is carried to the right, its lower end moves correspondingly to the left, and therefore the misalignment of the upper member 46 has caused an opposite movement of the lower member 46, which when it comes under the pressure of the belt will be in a position somewhat to the left of the neutral or properly aligned position, and it will resume its proper position as soon as the belt no longer contacts or rides up upon one of the blocks 63.

I claim:

1. In combination in a self-aligning rotor, a body and a plurality of surface members moveably positioned thereon, said surface members forming in effect the outer surface of the rotor, and means in said rotor for correcting misalignment of a belt with which said rotor is in contact, said means including pairs of cooperating inclined depressions positioned on said body member and on said surface members, and rotary members in said pairs of depressions.

2. In combination in a self-aligning rotor, a body and a plurality of surface members moveably positioned thereon, said surface members forming in effect the outer surface of the rotor, and means in said rotor for correcting misalignment of a belt with which said rotor is in contact, said means including pairs of cooperating inclined depressions positioned on said body member and on said surface members, and rotary members in said pairs of depressions, and guiding members positioned on each of said surface members.

3. In combination in a self-aligning rotor, a body and a plurality of surface members moveably positioned thereon, said surface members forming in effect the outer surface of the rotor, and means in said rotor for correcting misalignment of a belt with which said rotor is in contact, said means including pairs of cooperating inclined depressions positioned on said body member and on said surface members, and rotary members in said pairs of depressions, and guiding members positioned on each of said surface members, in a position to be contacted by a member which is in engagement with said surface member.

4. In combination in a self-aligning rotor, a body and a plurality of surface members moveably positioned thereon, said surface members forming in effect the outer surface of the rotor, and means in said rotor for correcting misalignment of a belt with which said rotor is in contact, said means including pairs of cooperating inclined depressions positioned on said body member and on said surface members, and rotary members in said pairs of depressions, and guiding members positioned on each of said surface members and extending laterally over an adjacent surface member.

5. In combination in a self-aligning rotor, a body and a plurality of surface members moveably positioned thereon, said surface members forming in effect the outer surface of the rotor, and means in said rotor for correcting misalignment of a belt with which rotor is in contact, said means including pairs of cooperating inclined depressions positioned on said body member and on said surface members, and rotary members in said pairs of depressions, and guiding members positioned on each of said surface members and extending laterally over an adjacent surface member in a position to be contacted by a member which is in engagement with said surface member.

6. In combination in a self-aligning pulley, a main body member and a plurality of surface forming members moveably positioned thereon, there being cooperating pairs of inclined grooves, one of each pair being formed in the body member and the other of each pair being formed in a surface member, and rotary parts in each of said pairs of grooves.

7. In combination in a self-aligning pulley, a main body member and a plurality of surface forming members moveably positioned thereon, there being cooperating pairs of inclined grooves, one of each pair being formed in the body member and the other of each pair being formed in a surface member, and rotary parts in each of said pairs of grooves, yielding means tending to hold oppositely placed pairs of surface members together.

8. In combination in a self-aligning pulley, a main body member and a plurality of surface forming members moveably positioned thereon, there being cooperating pairs of inclined grooves, one of each pair being formed in the body member and the other of each pair being formed in a surface member, and rotary parts in each of said pairs of grooves, and adjusting members positioned one on each end of each surface member.

9. In combination in a self-aligning pulley, a main body member and a plurality of surface forming members moveably positioned thereon, there being cooperating pairs of inclined grooves, one of each pair being formed in the body member and the other of each pair being formed in a surface member, and rotary parts in each of said pairs of grooves, and adjusting members positioned one on each end of each surface member and extending beyond said surface member toward an adjacent surface member and in position to be contacted by a belt which is engaging another surface member.

10. In combination in a self-aligning pulley, a main body member and a plurality of surface forming members moveably positioned thereon, there being cooperating pairs of inclined grooves, one of each pair being formed in the body member and the other of each pair being formed in a surface member, and rotary parts in each of said pairs of grooves, yielding means tending to hold oppositely placed pairs of surface members together, and adjusting members positioned one on each end of each surface member and extending beyond said surface member toward an adjacent surface member and in position to be contacted by a belt which is engaging another surface member.

11. In combination in a self-aligning pulley, an elongated pulley body with a plurality of plane sides, and a plurality of surface members, one moveably mounted adjacent each of said sides, said surface members formed with one plane surface and one arcuate surface, the plane surface being positioned adjacent the body member, there being pairs of inclined grooves, one groove of each pair being formed in the body member, and the other groove of each pair being formed in the adjacent surface member, and a rolling wedge member positioned in each pair of grooves, and an adjusting member positioned on each end of each surface member and extending over an adjacent surface member, and lying in position to be contacted by a belt positioned about said pulley.

12. In combination in a self-aligning rotor, a body and a plurality of surface members moveably positioned thereon, said surface members forming in effect the outer surface of the rotor, and means in said rotor for correcting misalignment of a belt with which said rotor is in contact, said means including pairs of cooperating inclined depressions positioned on said body member and on said surface members, and rotary members in said pairs of depressions, and means for moving said surface members laterally with respect to said body in response to misalignment of said belt.

13. In combination in a self-aligning rotor, a body and a plurality of surface members moveably positioned thereon, said surface members forming in effect the outer surface of the rotor, and means in said rotor for correcting misalignment of a belt with which said rotor is in contact, said means including pairs of cooperating inclined depressions positioned on said body member and on said surface members, and rotary members in said pairs of depressions, and means for moving said surface members laterally with respect to said body in response to misalignment of said belt, said means comprising a part positioned to be contacted by a misaligned belt and to move an adjacent surface member in the same direction as that in which the misalignment has occurred.

14. In combination in a self-aligning rotor, a body and a plurality of surface members moveably positioned thereon, said surface members forming in effect the outer surface of the rotor, and means in said rotor for correcting misalignment of a belt with which said rotor is in contact, said means including pairs of cooperating inclined depressions positioned on said body member and on said surface members, and rotary members in said pairs of depressions, and means for moving said surface members laterally with respect to said body in response to misalignment of said belt, said means including a lever arm extending from a surface member and overlying an adjacent surface member.

15. In combination in a self-aligning rotor, a body and a plurality of surface members moveably positioned thereon, said surface members forming in effect the outer surface of the rotor, and means in said rotor for correcting misalignment of a belt with which said rotor is in contact, said means including pairs of cooperating inclined depressions positioned on said body member and on said surface members, and rotary members in said pairs of depressions, and means for moving said surface members laterally with respect to said body in response to misalignment of said belt, said means including a wedge member positioned for rotation on said body and including means adapted to wedge a surface member in response to misalignment of the belt.

16. In combination in a self-aligning rotor, a body and a plurality of surface members moveably positioned thereon, said surface members forming in effect the outer surface of the rotor, and means in said rotor for correcting misalignment of a belt with which said rotor is in contact, said means including pairs of cooperating inclined depressions positioned on said body member and on said surface members, and rotary members in said pairs of depressions, and means for moving said surface members laterally with respect to said body in response to misalignment of said belt, said means including a wedge member positioned for rotation on said body and including means adapted to wedge a surface member in response to misalignment of the belt, said movement occurring in the opposite direction from that of the belt misalignment, and means for simultaneously communicating said surface member movement to the oppositely placed surface member and for moving it in the direction opposite to that in which the first mentioned surface member has moved.

17. In a self-aligning pulley, a pulley body, means for supporting it for rotation, and a plurality of belt engaging elements moveably mounted on said body and adapted to be interposed between said body and a belt passing thereabout, said moveable elements being longitudinally moveable along said pulley body, said pulley being mounted for rotation about a normally fixed axis, and members positioned on said belt engaging elements for moving said pulley-engaging elements, said last-mentioned members being positioned to be contacted by said belt, upon the occurrence of misalignment and being moveable in response to misalignment of the belt.

18. In a self-aligning pulley, a pulley body, means for supporting it for rotation, and a plurality of belt-engaging elements moveably mounted on said body and adapted to be interposed between said body and a belt passing thereabout, said moveable elements being longitudinally moveable along said pulley body, and pressure-responsive means mounted on each end of said belt-engaging elements for moving a pulley-engaging element in response to belt pressure into a proper alignment with respect to the pulley body when said pulley engaging element is subject to pressure from the belt.

19. In a self-aligning pulley, a pulley body, means for supporting it for rotation, and an even number of pulley engaging elements moveably mounted on said body and adapted to be interposed between said body and a belt passing thereabout, said moveable elements being longitudinally moveable along said pulley body, and means moveable with said body, for giving said pulley engaging elements longitudinal movement, and a rigid member connecting oppositely placed pulley engaging elements.

20. In a self-aligning pulley, a pulley body, means for supporting it for rotation, and an even number of pulley engaging elements moveably mounted on said body and adapted to be interposed between said body and a belt passing thereabout, said moveable elements being longitudinally moveable along said pulley body in response to belt misalignment, and means moveable with said body, for giving said pulley engaging elements longitudinal movement, and a rigid member connecting oppositely placed pulley engaging elements.

21. In a self-aligning pulley, a pulley body, means for supporting it for rotation, and an even number of pulley engaging elements moveably mounted on said body and adapted to be interposed between said body and a belt passing thereabout, said moveable elements being longitudinally moveable along said pulley body, said pulley being mounted for rotation about a normally fixed axis, and members positioned on said pulley for moving said pulley-engaging elements, said last-mentioned members being moveable in response to misalignment of the belt, and a rigid member connecting oppositely placed pulley engaging elements.

22. In a self-aligning pulley, a pulley body, means for supporting it for rotation, and an even number of pulley-engaging elements moveably mounted on said body and adapted to be interposed between said body and a belt passing thereabout, said moveable elements being longitudinally moveable along said pulley body, and pressure-responsive means for moving a pulley-engaging element into a proper alignment with respect to the pulley body when said pulley engaging element is subject to pressure from the belt, and a rigid member connecting oppositely placed pulley engaging elements.

23. In a self-aligning pulley, a pulley body, means for supporting it for rotation, and an even number of pulley engaging elements moveably mounted on said body and adapted to be interposed between said body and a belt passing thereabout, said moveable elements being longitudinally moveable along said pulley body, and means moveable with said body for giving said pulley engaging elements longitudinal movement, and a rigid member connecting oppositely placed pulley engaging elements, and cushion means engaging the ends of said rigid members in oppositely positioned pulley engaging elements, and cushion means interposed between said rigid members and said pulley body at a point intermediate the ends of said rigid members.

24. In a self-aligning pulley, a pulley body, means for supporting it for rotation, and an even number of pulley engaging elements moveably mounted on said body and adapted to be interposed between said body and a belt passing thereabout, said moveable elements being longitudinally moveable along said pulley body in response to belt misalignment, and means moveable with said body, for giving said pulley engaging elements longitudinal movement, and a rigid member connecting oppositely placed pulley engaging elements, and cushion means engaging the ends of said rigid members in oppositely positioned pulley engaging elements and cushion means interposed between said rigid members and said pulley body at a point intermediate the ends of said rigid members.

25. In a self-aligning pulley, a pulley body, means for supporting it for rotation, and an even number of pulley engaging elements moveably mounted on said body and adapted to be interposed between said body and a belt passing thereabout, said moveable elements being longitudinally moveable along said pulley body, said pulley being mounted for rotation about a normally fixed axis, and members positioned on said pulley for moving said pulley-engaging elements, said last-mentioned members being moveable in response to misalignment of the belt, and a rigid member connecting oppositely placed pulley engaging elements, and cushion means engaging the ends of said rigid members in oppositely positioned pulley engaging elements, and cushion means interposed between said rigid members and said pulley body at a point intermediate the ends of said rigid members.

26. In a self-aligning pulley, a pulley body, means for supporting it for rotation, and an even number of pulley-engaging elements moveably mounted on said body and adapted to be interposed between said body and a belt passing thereabout, said moveable elements being longitudinally moveable along said pulley body, and pressure-responsive means for moving a pulley-engaging element into a proper alignment with respect to the pulley body when said pulley engaging element is subject to pressure from the belt, and a rigid member connecting oppositely placed pulley engaging elements, and cushion means engaging the ends of said rigid members in oppositely positioned pulley engaging elements, and cushion means interposed between said rigid members and said pulley body at a point intermediate the ends of said rigid members.

27. In a self-aligning pulley, a pulley body, means for supporting it for rotation, and a plurality of pulley engaging elements moveably mounted on said body and adapted to be interposed between said body and a belt passing thereabout, said moveable elements being longitudinally moveable along said pulley body, and means moveable with said body, for giving said pulley engaging elements longitudinal movement, said last-mentioned means comprising wedge members pivotally supported on said body, and links joining said wedges with said pulley engaging elements.

28. In a self-aligning pulley, a pulley body, means for supporting it for rotation, and a plurality of belt-engaging elements movably mounted on said body and adapted to be interposed between said body, and a belt passing thereabout, said movable elements being longitudinally movable along said pulley body, and means secured upon each end of said belt-engaging elements and movable with each of them, for giving said belt-engaging elements longitudinal movement, said means positioned to be contacted by said belt, upon the occurrence of misalignment.

29. In a self-aligning pulley, a pulley body, means for supporting it for rotation, and a plurality of belt-engaging elements movably mounted on said body and adapted to be interposed between said body and a belt passing thereabout, said movable elements being longitudinally movable along said pulley body in response to belt misalignment, and means secured upon each end of said belt-engaging elements and movable with each of them for giving said belt-engaging elements longitudinal movement, said means positioned to be contacted by said belt, upon the occurrence of misalignment.

RUDOLPH F. HLAVATY.